United States Patent [19]
Borowiec et al.

[11] Patent Number: 5,952,792
[45] Date of Patent: Sep. 14, 1999

[54] COMPACT ELECTRODELESS FLUORESCENT A-LINE LAMP

[75] Inventors: Joseph Christopher Borowiec, Schenectady; Joseph Darryl Michael, Clifton Park, both of N.Y.

[73] Assignee: General Electric Company, Schenectady, N.Y.

[21] Appl. No.: 09/114,232

[22] Filed: Jun. 23, 1998

Related U.S. Application Data

[63] Continuation-in-part of application No. 08/705,098, Aug. 28, 1996, abandoned.

[51] Int. Cl.$^6$ .................................................. H05B 37/02
[52] U.S. Cl. ............................................. 315/248; 310/85
[58] Field of Search ........................... 315/248, 85, 57, 315/71, 56; 336/175; 313/493

[56] References Cited

U.S. PATENT DOCUMENTS

| | | | |
|---|---|---|---|
| 4,119,889 | 10/1978 | Hollister | 315/248 |
| 4,171,503 | 10/1979 | Kwon . | |
| 4,480,212 | 10/1984 | Monahan et al. | 315/71 |
| 4,490,649 | 12/1984 | Wang | 315/56 |
| 4,675,577 | 6/1987 | Hanlet . | |
| 4,727,295 | 2/1988 | Postma | 315/248 |
| 5,306,986 | 4/1994 | Siag | 315/248 |
| 5,504,394 | 4/1996 | Johnson | 315/71 |
| 5,723,947 | 3/1998 | Popor et al. | 315/248 |

FOREIGN PATENT DOCUMENTS

| | | |
|---|---|---|
| 0187494 | 12/1985 | European Pat. Off. . |
| 0447957 | 3/1991 | European Pat. Off. . |
| 0601893 | 12/1993 | European Pat. Off. . |

*Primary Examiner*—Michael B Shingleton
*Attorney, Agent, or Firm*—Jill M. Breedlove; Douglas E. Stoner

[57] ABSTRACT

A compact electrodeless fluorescent lamp has an A-line configuration including a globular upper portion which becomes narrower toward a lower portion, terminating in a narrow end. The narrow end of the A-line envelope is connected to a base. The alternating current energy source is electrically connected through the base, via a ballast, to the excitation coil. The ballast is integral with the lamp and is contained substantially within the re-entrant cavity.

6 Claims, 4 Drawing Sheets

COMPACT ELECTRODELESS FLUORESCENT A-LINE LAMP

This application is a CIP of application Ser. No. 08/705,098 filed Aug. 28, 1996 now abandoned.

FIELD OF THE INVENTION

The present invention relates generally to fluorescent lamps and, more particularly, to compact electrodeless fluorescent lamps configured as A-line incandescent lamps.

BACKGROUND OF THE INVENTION

Compact fluorescent lamp products of the type having a lamp and integral ballast provide energy savings and have a longer useful life as compared to incandescent lamps of equivalent light output Typical compact fluorescent lamps have tubular envelopes with one or more generally U-shaped bends. The number of bends in the lamp is a function of the desired light output and size of the lamp. Compact fluorescent lamps may utilize electrodes or may be electrodeless. The lamp is connected to an electromagnetic or electronic ballast, the latter being preferred because electronic ballasts are more compact. In a typical compact fluorescent lamp system, the interface between the lamp and ballast is the widest physical dimension.

The overall length of a compact fluorescent lamp and ballast exceeds that of an equivalent incandescent lamp. The most common configuration of an incandescent lamp is referred to as A-line. There are three typical A-line bulb sizes, that is, A19, A21 and A23, with the number corresponding to the maximum diameter of the bulb in eighths of inches. For example, an A21 bulb is twenty-one eighths, or 2⅝, inches in maximum diameter. Typical power outputs of such A-line incandescent lamps is in the range from about 25 to 250 Watts. Disadvantageously, presently available compact fluorescent lamps which use less energy and have a longer useful life cannot be used in incandescent lamp fixtures.

Accordingly, it is desirable to provide a compact fluorescent lamp capable of operating in incandescent lamp fixtures,

SUMMARY OF THE INVENTION

A compact electrodeless fluorescent lamp according to the present invention has an A-line configuration comprising a globular upper portion which becomes narrower toward a lower portion, terminating in a narrow end. The envelope has a re-entrant cavity formed therein with an excitation coil being situated within the re-entrant cavity for providing an alternating magnetic field when excited by an alternating current energy source, resulting in an arc discharge which emits ultraviolet radiation. The envelope has an interior phosphor coating for emitting visible radiation when excited by ultraviolet radiation. The narrow end of the A-line envelope is connected to a base (e.g., an Edison screw-type base). The alternating current energy source is electrically connected through the base, via a ballast, to the excitation coil. The ballast is integral with the lamp and is contained substantially within the re-entrant cavity.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
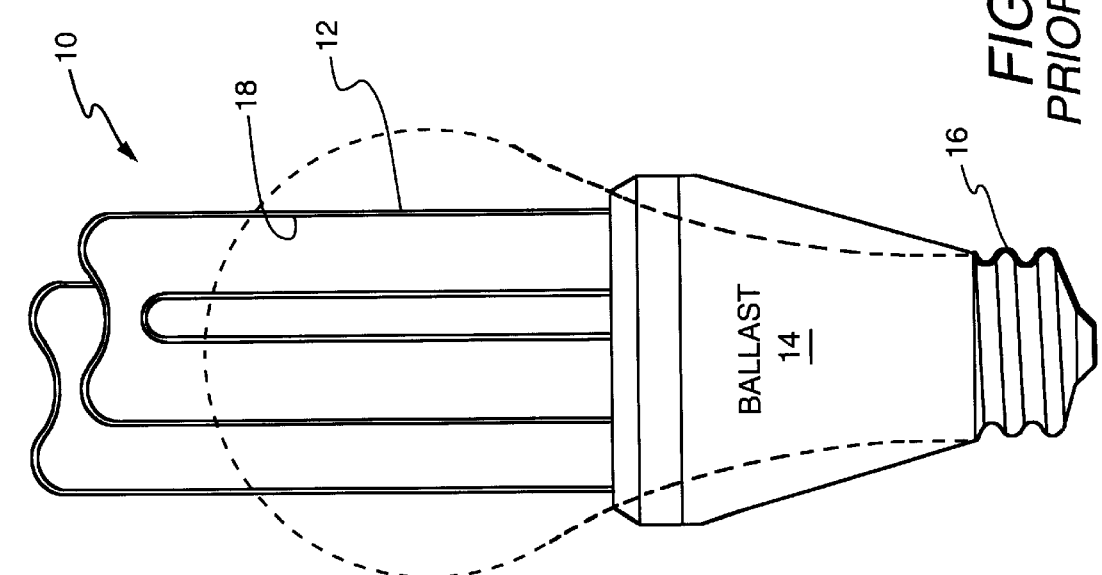
FIG. 1 is a front view illustrating the configuration of a typical compact fluorescent lamp.

FIG. 1 illustrates a typical compact fluorescent lamp 10 including a gas-tight envelope 12 having multiple U-shaped tubular portions made from a translucent material. The envelope contains a fill comprising mercury and at least one noble gas. The envelope is connected to a base structure which includes a housing 14 for a ballast and a base 16, e.g., an Edison screw-type base, for connection through a fixture (not shown) to an alternating current energy source. By way of illustration only, the discharge tube of FIG. 1 is shown as having two U-shaped tubular sections, each U-shaped tubular section having two ends for plugging into the ballast. A phosphor layer 18 is applied to the inner surface of the discharge tube for converting ultraviolet radiation, which is generated by excitation of the fill, into visible light.

Figure 2:
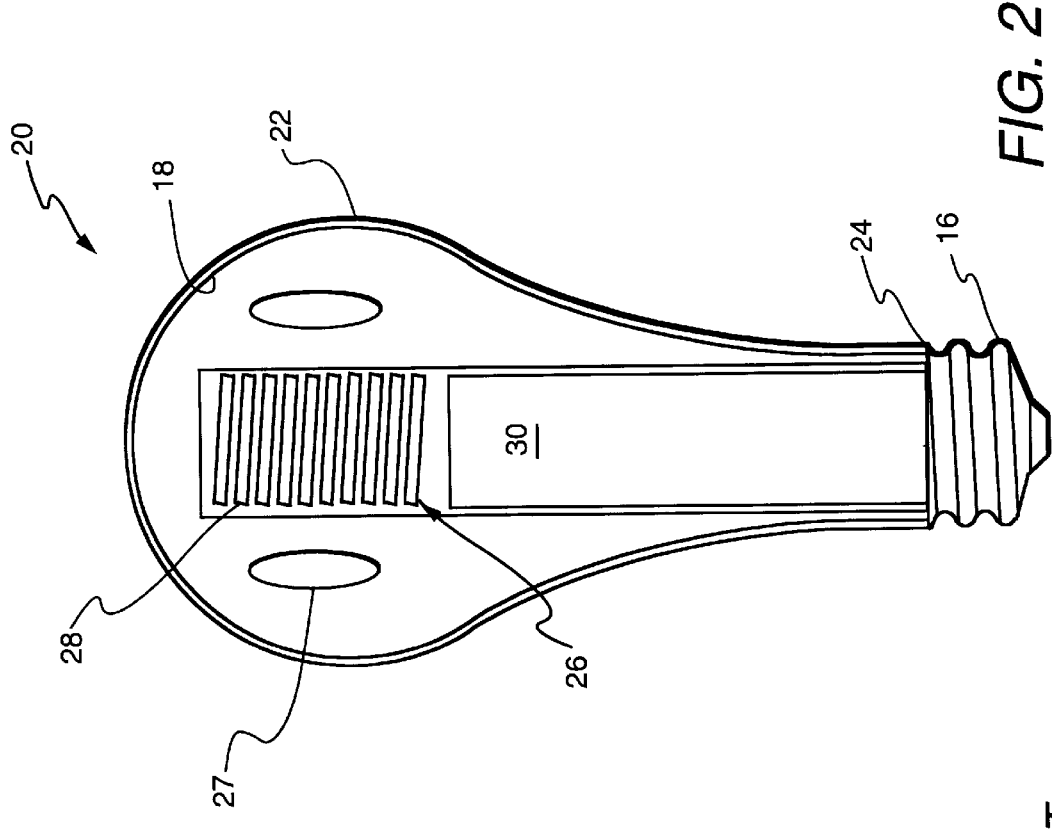
FIG. 2 is a front view illustrating an electrodeless compact fluorescent lamp according to the present invention.

In accordance with the present invention, as illustrated in FIG. 2, a compact electrodeless fluorescent lamp 20 has an A-line configuration which advantageously allows for operation of the compact fluorescent lamp in a typical incandescent lamp fixture for an incandescent lamp of equivalent light output. The envelope for the A-line compact fluorescent lamp comprises a globular upper portion 22 which becomes narrower toward a lower portion, terminating in a narrow end 24. The envelope has a re-entrant cavity 26 formed therein with an excitation coil 28 being situated within the re-entrant cavity for providing an alternating magnetic field when excited by an alternating current energy source, resulting in an arc discharge 27 which emits ultraviolet radiation. The envelope has an interior phosphor coating 18 for emitting visible radiation when excited by ultraviolet radiation. The narrow end 24 of the A-line envelope is connected to base 16 (e.g., an Edison screw-type base). The alternating current energy source is electrically connected through the base, via a ballast 30, to the excitation coil. The ballast is integral with the lamp and is contained substantially within the re-entrant cavity. A metallic housing 31 is shown as surrounding ballast 30 to act as a heat sink and an EMI shield.

Figure 3:
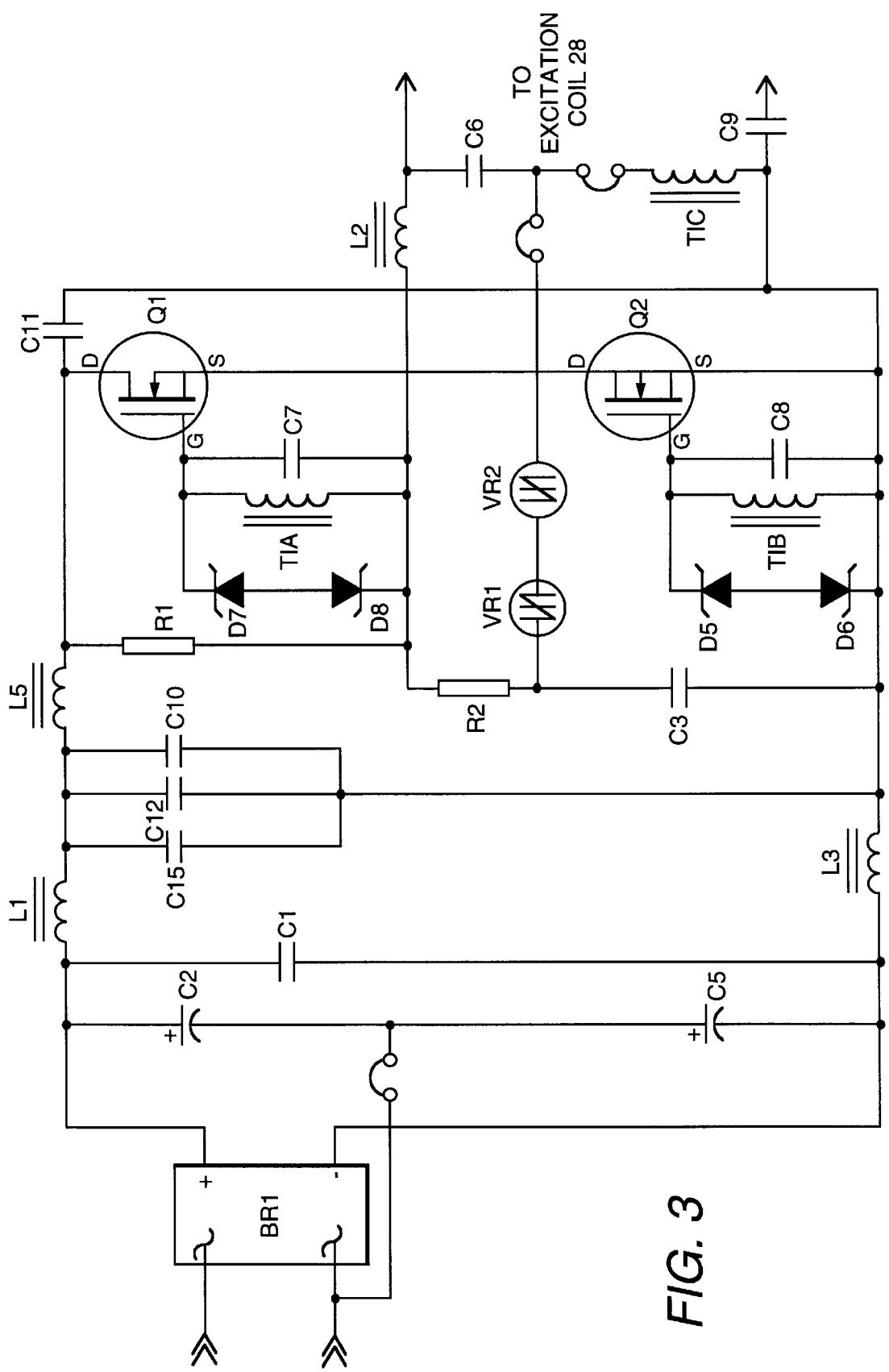
FIG. 3 schematically illustrates one embodiment of a ballast useful for operating the lamp of FIG. 2.

FIG. 3 schematically illustrates a ballast suitable for operating the compact electrodeless fluorescent lamp of FIG. 2 and capable of being configured for positioning within re-entrant cavity 26. The illustrated ballast is a typical Class-D power amplifier with switching devices Q1 and Q2 connected together in a half-bridge configuration to be driven alternately between cutoff and saturation such that one is conducting while the other one is turned off and vice versa. Gate drive circuits connected to the gate of each switching device include input isolation transformer secondary windings T1A and T1B, respectively, timing capacitors C7 and C8, respectively, and Zener-diode pairs D7–D8 and D5–D6, respectively, for protecting the gates from high-voltage spikes. T1C is the primary winding of the input isolation transformer. A resonant tank circuit comprising an inductor L2 and a capacitor C6 is connected to the half-bridge at the junction between switching devices Q1 and Q2 and in parallel with switching device Q2. A starting circuit is shown as comprising sidacs VR1 and VR2, resistors R1 and R2, and a capacitor C3; the starting circuit provides a sufficiently high initial current for starting the lamp. A capacitor C9 is provided for dc blocking. The ballast of FIG. 3 also includes a circuit for protection against electromagnetic interference protection comprising inductors L6, L1, L3 and capacitors C1, C15, C12 and C10. Input bridge rectifiers for rectifying the input ac voltage are represented by block BR1; and input filter capacitors are represented as C2 and C5. Capacitors C2 and C5 are preferably electrolytic capacitors.

Figure 4:
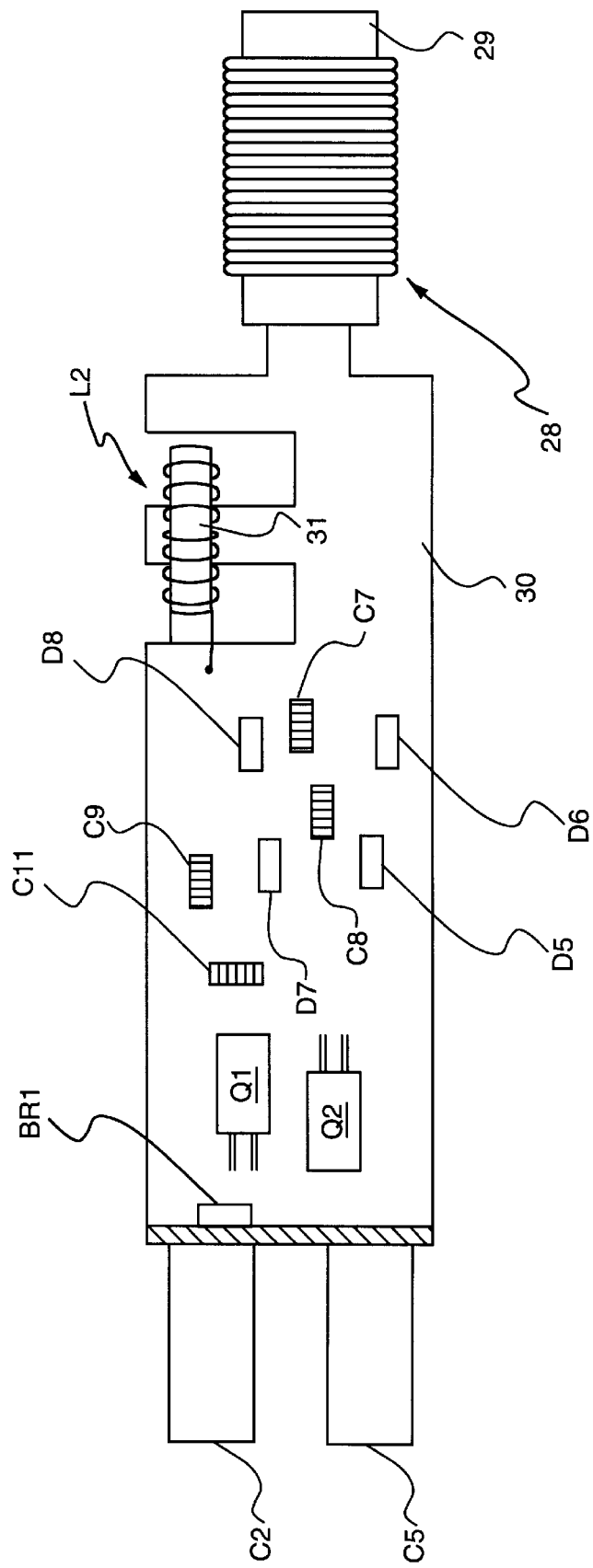
FIG. 4 illustrates the layout of one side of the ballast of FIG. 3.
Figure 5:
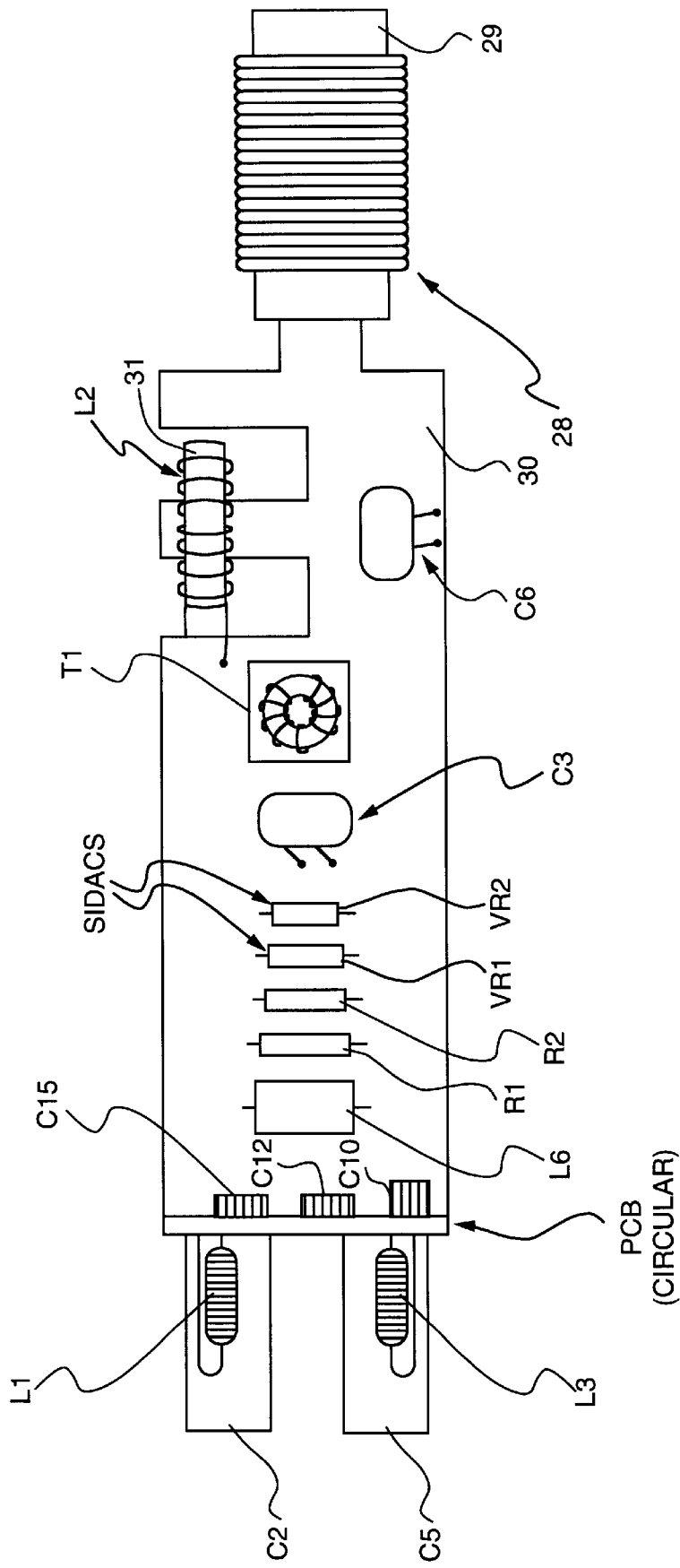
FIG. 5 illustrates the layout of the other side of the ballast of FIG. 3.

FIGS. 4 and 5 are side views illustrating an exemplary layout of the ballast of FIG. 3 on a printed circuit board 30 wherein the ballast is positioned within the re-entrant cavity of FIG. 2. An exemplary re-entrant cavity has an inner diameter of 25 mm, and the width of an exemplary ballast circuit according to FIG. 3 is 22 mm, such that the ballast easily fits within the re-entrant In the specific embodiment of FIGS. 4 and 5, electrolytic capacitors C2 and C5 are situated to extend into base 16 (FIG. 1).

As shown in FIGS. 4 and 5, the printed circuit board is configured to support excitation coil 28 and transformer L2. In particular, one end of the printed circuit board is shaped to receive a core 29 around which coil 28 is wound. Similarly, the printed circuit board is shaped to receive a core 31 of inductor L2.

An integral lamp and ballast configuration according to the present invention, i.e., with the ballast configured to fit within the re-entrant cavity of a compact electrodeless fluorescent lamp, advantageously makes the lamp even more compact and allows for use of such lamp in the fixture of an A-line incandescent lamp having equivalent light output. Such use for the re-entrant cavity of a compact electrodeless fluorescent lamp to provide an integral lamp and ballast configuration for a compact electrodeless fluorescent lamp should render such lamps more attractive and feasible for widespread use, thereby allowing for the widespread realization of the benefits of compact fluorescent lamps, i.e., economy and longer life.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A compact fluorescent lamp, comprising:

a gas-tight, light-transmissive envelope containing a fill for sustaining an arc discharge which emits ultraviolet radiation when the fill is subjected to an alternating frequency magnetic field, the envelope having a re-entrant cavity formed therein, an excitation coil being situated within the re-entrant cavity for providing the alternating magnetic field when excited by an alternating current energy source, the envelope having an interior phosphor coating for emitting visible radiation when excited by ultraviolet radiation, the envelope having an A-line configuration comprising a globular upper portion which becomes narrower toward a lower portion, terminating in a narrow end;

a ballast for electrically connecting the alternating current energy source to the excitation coil and thereby operating the lamp, the ballast being integral with the lamp and contained substantially within the re-entrant cavity; and a base connected to the narrow end of the envelope, the base being adapted for connecting the ballast to the alternating current energy source.

2. The lamp of claim 1 wherein the ballast comprises a Class-D power amplifier.

3. The lamp of claim 1 wherein the ballast is configured on a printed circuit board.

4. The lamp of claim 3 wherein the printed circuit board is configured to support a core about which the excitation coil is wound.

5. The lamp of claim 3 wherein the ballast is configured to support a core of at least one ballast inductor.

6. The lamp of claim 1, further comprising a metallic housing surrounding the ballast.

\* \* \* \* \*